United States Patent [19]

Volz et al.

[11] Patent Number: 5,647,644
[45] Date of Patent: Jul. 15, 1997

[54] SOLENOID VALVE, ESPECIALLY FOR HYDRAULIC BRAKE SYSTEMS WITH SLIP CONTROL

[75] Inventors: Peter Volz, Darmstadt; Dalibor Zaviska, Eschborn/Ts, both of Germany

[73] Assignee: ITT Automotive Europe GmbH, Frankfurt, Germany

[21] Appl. No.: 464,902

[22] PCT Filed: Nov. 4, 1994

[86] PCT No.: PCT/EP94/03622

§ 371 Date: Dec. 14, 1995

§ 102(e) Date: Dec. 14, 1995

[87] PCT Pub. No.: WO95/13945

PCT Pub. Date: May 26, 1995

[30] Foreign Application Priority Data

Nov. 18, 1993 [DE] Germany .................. 43 39 305.5

[51] Int. Cl.$^6$ ................. B60T 8/36; B60T 8/50
[52] U.S. Cl. ...................... 303/119.2; 303/113.1
[58] Field of Search .............. 303/119.2, 119.1, 303/900, 901, 84.1, 84.2, 87, 113.2, 113.1, 113.3; 137/596.17; 251/129.19, 129.02, 129.07, 129.18, 129.15; 91/433

[56] References Cited

U.S. PATENT DOCUMENTS

| | | | |
|---|---|---|---|
| 5,076,538 | 12/1991 | Mohr et al. | 303/119.2 |
| 5,290,096 | 3/1994 | Beck et al. . | |
| 5,333,946 | 8/1994 | Goossens et al. | 303/119.2 |
| 5,370,450 | 12/1994 | Volz et al. . | |
| 5,388,899 | 2/1995 | Volz et al. | 303/119.2 |
| 5,401,087 | 3/1995 | Goossens | 303/119.2 |
| 5,443,309 | 8/1995 | Beck | 303/119.2 |

FOREIGN PATENT DOCUMENTS

| | | |
|---|---|---|
| 0 181 643 | 5/1986 | European Pat. Off. . |
| 0 317 305 | 5/1989 | European Pat. Off. . |
| 3 725 810 | 2/1989 | Germany . |
| 3 934 771 | 3/1991 | Germany . |
| 4 028 606 | 3/1992 | Germany . |
| 4 035 817 | 5/1992 | Germany . |
| 4 332 819 | 3/1995 | Germany . |
| 331 213 | 4/1972 | U.S.S.R. . |
| 9118774 | 12/1991 | WIPO . |
| 9429150 | 12/1994 | WIPO . |

OTHER PUBLICATIONS

English translation corresponding to WO 9 429 150, entitled Hydraulic Brake System with Slip Control and labeled PC 7511.

English translation corresponding to DE 4 332 819, entitled Hydraulic Brake System with Slip Control and labeled PC 7564.

*Primary Examiner*—Douglas C. Butler
*Attorney, Agent, or Firm*—Thomas N. Twomey; J. Gordon Lewis

[57] ABSTRACT

A solenoid valve for use with a slip-controlled brake system has an annular piston with a switchable diaphragm in order to lower the valve noises. The annular piston moves, in response to differential pressure, between a first position at which a pressurized medium flow path parallel to the diaphragm exists and a second position at which pressurized medium flows exclusively through the diaphragm. A pressurized agent channel, arranged upstream of the valve seat, has a portion having a reduced cross section relative to the valve seat, into which a channel branch of small nominal diameter opens. With this design, the pressure energy of the pressurized medium column flowing into the solenoid valve is converted into kinetic energy, which initiates a pressure gradient in the channel branch and prevents premature switching of the annular piston into the diaphragm position during slip-free normal braking.

10 Claims, 3 Drawing Sheets

SOLENOID VALVE, ESPECIALLY FOR HYDRAULIC BRAKE SYSTEMS WITH SLIP CONTROL

This application is the U.S. national-phase application of PCT International Application No. PCT/EP94/03622.

FIELD OF THE INVENTION

The present invention pertains to a solenoid valve, especially for hydraulic brake systems with slip control, having an opening formed in an annular piston in the valve and through which pressurizing medium passes to control brake operation.

BACKGROUND OF THE INVENTION

The intermittent control of pressurized medium in slip-controlled brake systems by digitally switchable inlet and outlet valves leads to undesired sound emission as a consequence of the pulsed changes in pressure.

It was found in the brake systems described in German Patent Application No. P 43 19 227.0 that the solutions suggested for arranging the annular piston provided with a switchable diaphragm in the inlet valve do not always make it possible to avoid an unintended switching of the annular piston into the diaphragm position during manual, slip-free brake actuation. The annular piston having a "switchable diaphragm" moves between a first position and a second position (i.e., "diaphragm position"). At the first position, a pressurized medium flow path across a face of the annular piston extends unhindered from the valve seat to a pressure line, in parallel to the diaphragm. At the second position, this pressurized medium flow path is closed and pressurized medium flows from the valve seat to the pressure line exclusively through the diaphragm. An undesired premature activation of the switchable diaphragm associated with the inlet valve cannot be ruled out with sufficient certainty, especially in the case of rapid actuation of the brake (e.g., panic braking). In the event of such premature activation of the switchable diaphragm, the feel of the pedal and the vehicle-specific pressure build-up gradient will change. A reduction in the pressure build-up gradient brought about by the diaphragm action inherently leads to a reduction in braking power.

It was therefore proposed in German Patent Application No. P 43 32 819.9 that fixed diaphragms be additionally arranged upstream or downstream of the solenoid valve (inlet valve), but the result is that the switchover pressure or the switching pressure difference of the switchable diaphragm remains relatively high, which may lead to undesired fluctuations in the volume flow during the brake pressure control.

SUMMARY OF THE INVENTION

A task of the present invention is therefore to prevent a premature, undesired activation of the switchable diaphragm during the slip-free normal braking phase, while possibly maintaining unchanged the simple design of the brake system disclosed in German Patent Application No. P 43 19 227.0.

According to the present invention, a pressurized agent channel arranged upstream of the valve seat has a portion having a reduced cross section (i.e., a channel constriction). Opening into this channel is a channel branch of small nominal diameter, extending in the direction of a front surface of the annular piston. Consequently, the pressure energy of the pressurized medium column flowing into the solenoid valve is converted in the portion having a reduced cross section into kinetic energy, which initiates a pressure gradient in the channel branch.

Due to the design according to the present invention, the pressure gradient generated directly at the narrowest flow cross section is used to hold the annular piston in the deactivated switching position in order to prevent premature switching of the annular piston into the diaphragm position during slip-free normal braking.

Additional features, advantages and possible applications of the present invention will become apparent from the following description of a number of exemplary embodiments.

DETAILED DESCRIPTION OF THE INVENTION

Figure 1:
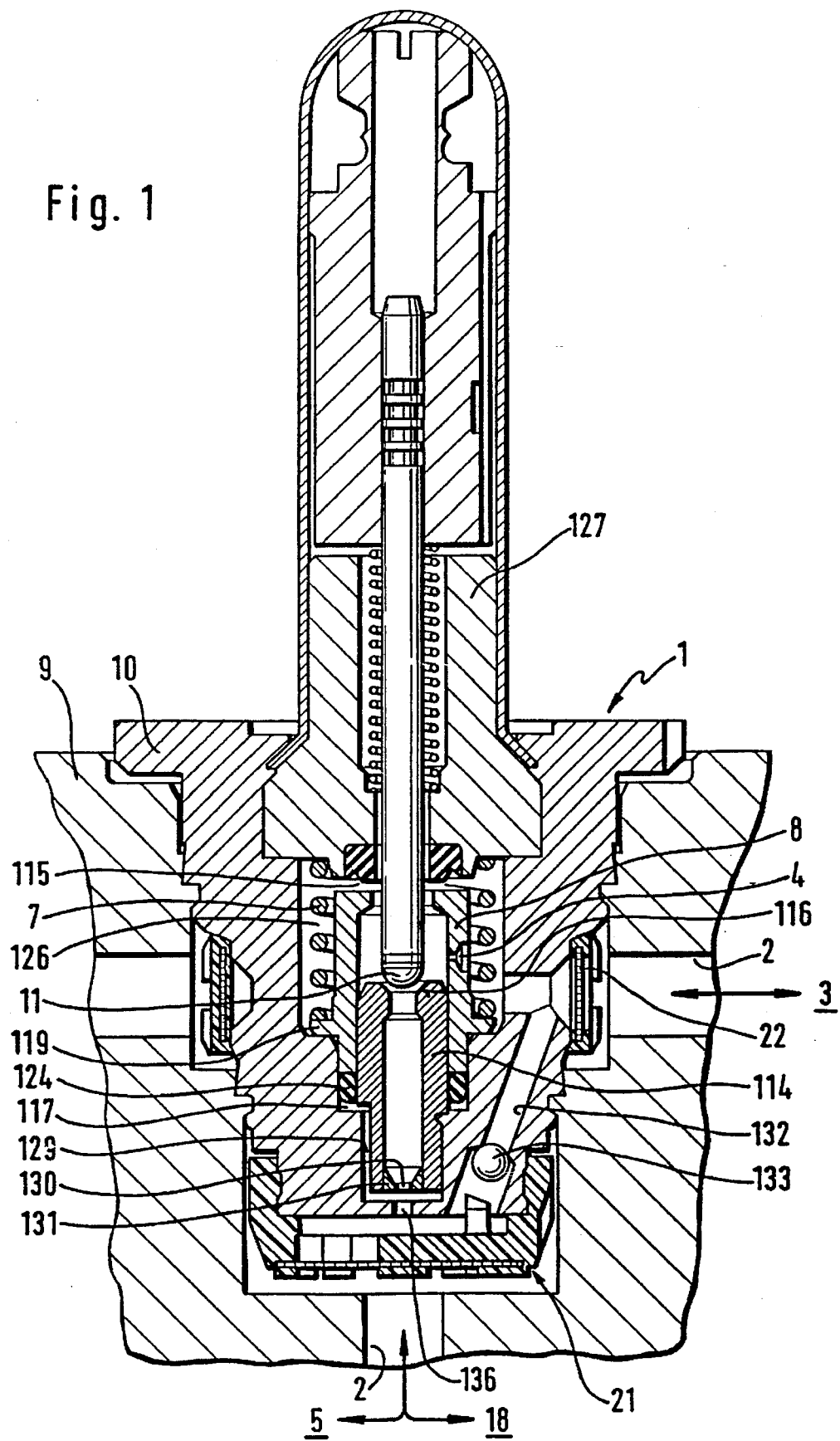
FIG. 1 shows a partial view of a solenoid inlet valve on an enlarged scale, with the channel arrangement according to the present invention under the valve-closing member.

FIG. 1 shows a longitudinal section of an exemplary embodiment of the overall design of the inlet valve 1 for a slip-controlled brake system. The inlet valve 1 has a valve support 10, which contains the valve-closing member 11 and which defines the channel guide of the main pressure line 2 coming from the brake pressure transducer 5 and from the auxiliary pressure pump 18. The valve support 10 is integrated in a valve-mounting body 9 preferably in a cartridge design (such as a screw-in cartridge, a wedged cartridge, or a cartridge with an expanding ring). In the selected representation of the valve-fastening system, the valve support 10 is affixed to the valve-mounting body 9 by twofold self-wedging. The sealing of the valve support 10 in the valve-mounting body 9 is guaranteed by self-wedging.

There is a pressurized medium communication to the annular piston 8 via the main pressure line 2, which is connected to the brake pressure transducer 5 and to the auxiliary pressure pump 18, through a plate filter 21 clipped onto the extension of the valve support 10, and via the valve-closing member 11, which is open in the normal position and selectively prevents pressurized medium flow across a valve seat 116. From the annular piston 8, the pressurized medium flows in the direction of the ring filter 22 arranged upstream of the connection to the wheel brake 3 via the open annular gap between the annular piston 8 and the solenoid core 127 and, to a lesser extent, also via the diaphragm 4.

A valve sleeve, over which the valve coil, not shown explicitly in the figure, is drawn, projects over the solenoid core 127. The valve sleeve forms a unit wedged in the valve support 10 together with the solenoid core. A valve lifter provided with an armature extends through the solenoid core 127 to the valve seat 116. The valve-closing member 11 is formed in the end area of the valve lifter.

The annular piston 8 assumes the switchable diaphragm function as a consequence of a cross hole through the wall of the annular piston. The annular piston 8 is guided axially moveably on an extension of the rotationally symmetrical central body 114 having the valve seat 116 in the annular space 126. Under the action of a compression spring 7, the annular piston 8 is supported with its outer shoulder 119, which acts as a stop, on the step of valve support 10 in the annular space 126. The annular piston 8 has essentially the shape of a sleeve, which is located opposite the front area of the solenoid core 127 provided with a rubber sealing seat 115. The annular piston 8 has a face facing the solenoid core 127 and exposed to annular space 126, which is in pressurized medium communication with main pressure line 2 leading to wheel brake 3. If desired or necessary, the sealing may also be designed as a metallic flat packing or with an O-ring inserted in the front surface area of the annular piston 8.

A sealing ring 124, which prevents pressurized medium from flowing over from the brake pressure transducer 5 in the direction of the wheel brake 3, is located in the space 117 on the side of the annular piston 8 facing away from the solenoid core 127. Another face of the annular piston 8 is exposed to the space 117, which is in pressurized medium communication with main pressure line 2 leading to brake pressure transducer 5 and auxiliary pressure pump 18.

Via a channel branch 129, which extends between the central body 114 and the valve support 10, the space 117 is in pressurized medium communication with a portion having a reduced cross section (i.e., a channel constriction 130), which is provided in the lower area of the central body 114 and is preferably formed by a diaphragm insert 131. The rotationally symmetrical central body 114 extending into the inner space of the valve is pressed or wedged into the stepped hole of the valve support 10. In the exemplary embodiment shown, the valve seat 116 is designed as an integral part of the hole of the central body 114 extending coaxially to the valve-closing member 11. The central body 114 is held as a stepped sleeve part in the valve support 10 by means of a self-wedging.

The opening (through which pressurized medium flows) defined by channel constriction 130 is smaller in diameter than the opening defined by valve seat 116. This difference in size of the openings causes a pressure gradient (or decrease) in channel branch 129. The specific sizes of the openings of channel constriction 130 and valve seat 116 differ widely depending on the brake type. In one exemplary embodiment, the diameter of the opening defined by channel constriction 130 is about 0.3 to 0.9 mm, while the opening defined by valve seat 116 is approximately 1.2 mm.

A pressurized medium path 132 extends obliquely to the central body 114 in the valve support 10. Disposed in path 132 is a check valve 133, which closes in the direction of the wheel brake 3. Check valve 133 makes possible a liquid-filtering pressurized medium connection between the wheel brake 3 and the brake pressure transducer 5 or the auxiliary pressure pump 18 via a ring filter located between and at spaced locations from the valve support 10 and the valve-mounting body 9 as well as by means of at least one free path shown in the figure at the plate filter 21.

Figure 2:
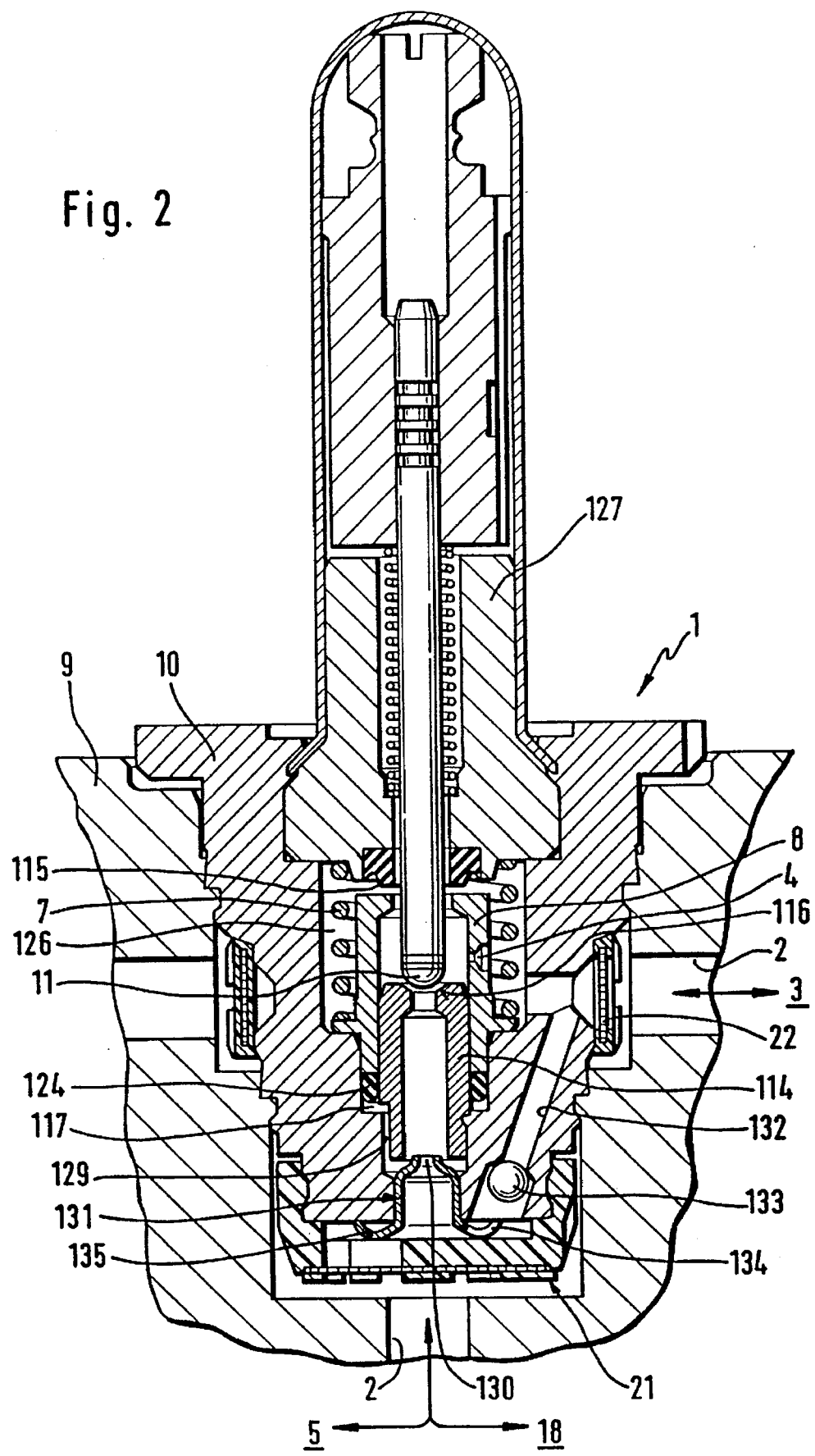
FIG. 2 shows an alternative embodiment of the present invention.

FIG. 2 shows, unlike FIG. 1, a special design of the channel constriction 130 by use of a diaphragm insert 131, which has essentially the contour of a nozzle and is designed as a thin-walled body, comparable to a venturi tube. The diaphragm insert 131 has a shoulder 135, which is provided with recesses 134 and is clamped between the plate filter 21 and the valve support 10. The recess 134 is designed such that it partially covers the check valve 133 in the pressurized medium path 132 in order to keep the check valve 133 in the pressurized medium path 132. The diaphragm insert 131 is preferably designed as a pressed part made of a light-gauge sheet or as an injection-molded plastic part. The channel constriction 130 acts as a circular cross section within the diaphragm insert 131 on the pressurized medium flow of the brake pressure transducer 5 or of the auxiliary pressure pump 18. In addition, the design of the diaphragm insert 131 as a nozzle orifice results in a tapered annular cross section in the area in which the channel branch 129 opens into the main flow of the main pressure line 2.

All the additional elements shown in the graphic representation in FIG. 2 correspond essentially to the design and the function according to FIG. 1.

Figure 3:
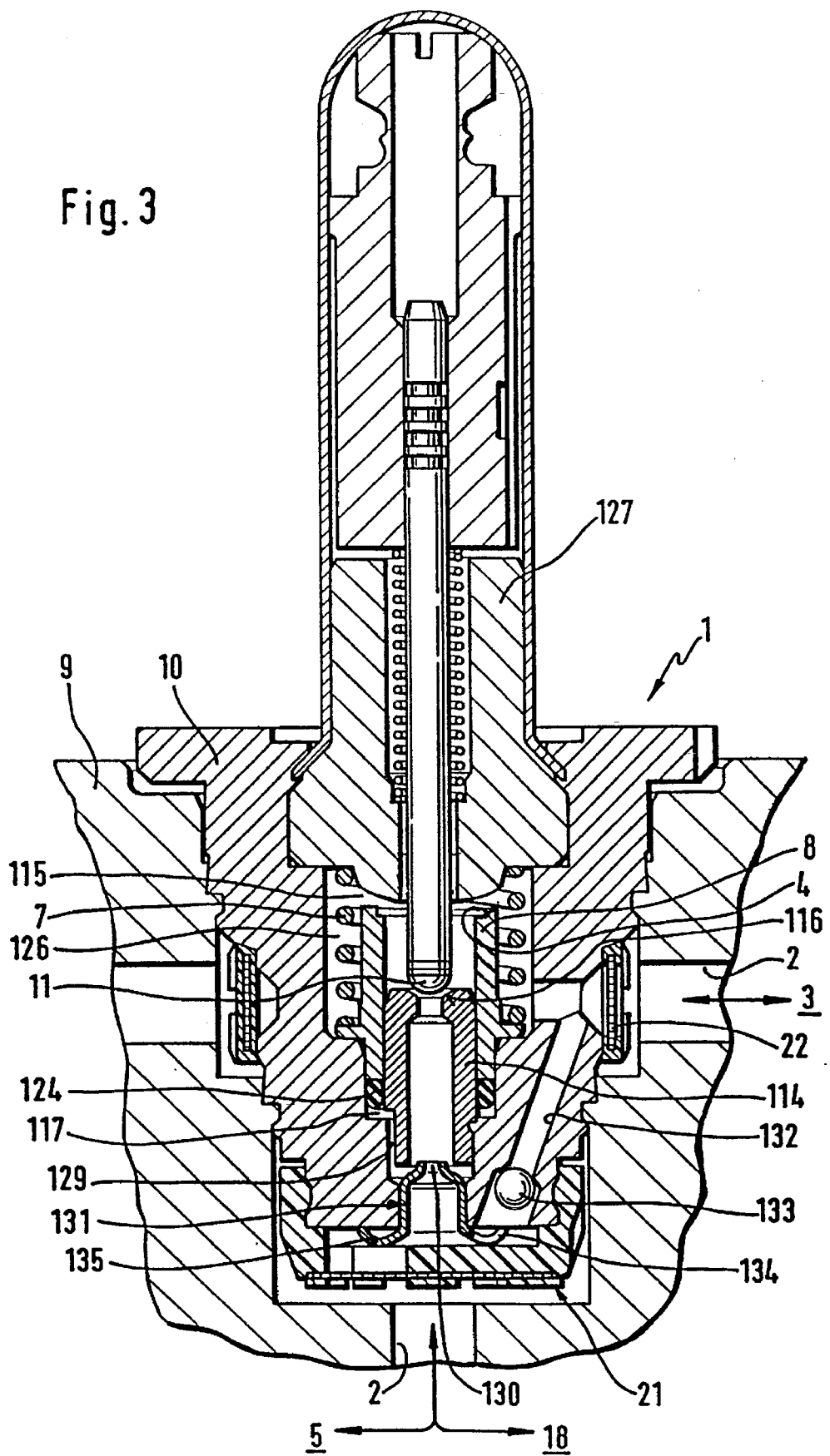
FIG. 3 shows a variant of the inlet valve shown in FIG. 2, which has a modified sealing seat and diaphragm.

FIG. 3 shows, unlike FIG. 2, a metallic sealing of the front surface at the annular piston 8 when the latter is moved in the direction of the solenoid core 127 against the action of the compression spring 7 as a consequence of a pressure difference at the two front surfaces of the annular piston 8. The sealing seat 115 at the solenoid core 127 is preferably designed as a sealing seat that is crowned or spherical in the direction of the annular piston 8, so that an annular sealing surface is obtained. An especially simple embodiment of the diaphragm 4 in the annular piston 8 is obtained when the diaphragm 4 is shaped as a notch in the front surface of the annular piston 8, instead of as a hole. This leads to the desired diaphragm function at the annular piston 8 as soon as the latter comes into contact with the metallic sealing seat 115. Unlike in the case of the embodiments designed as diaphragm holes according to FIGS. 1 and 2, debris (possibly caused by wear) or dirt particles cannot lead to clogging of the notch, because it is subject to a self-cleaning function due to the opening and closing of the annular piston 8. All the other details shown in FIG. 3 can be found in the descriptions of the above exemplary embodiments.

The mode of operation of the present invention is explained below:

The inlet valve 1 is in the electromagnetically non-excited, open normal position during an uncontrolled, slip-free normal braking phase. When the brake pressure transducer 5 is actuated, an increasing pressure build-up gradient is initiated in the inlet valve 1, and this gradient leads to a considerably increasing velocity of flow, which establishes a pressure gradient in the direction of the space 117 in the essentially gap-like channel branch 129. This pressure gradient also acts on the annular piston 8 via the sealing ring 124 at the annular piston 8. The compression spring 7, which holds the annular piston 8 in the starting position, is hydrodynamically supported by the increased pressure difference between the two front surfaces on the annular piston 8, so that there is an unhindered pressurized medium communication between the sealing seat 115 and the front surface of the annular piston 8 even during the rapid initial braking phase. The annular piston 8 thus remains in the starting position according to the figure, in contact with the step of the valve support 10 acting as a stop, so that pressurized medium can propagate unhindered to the wheel brake 3 via the annular gap between annular piston 8 and solenoid core 127. The undesired premature activation of the diaphragm 4 integrated within the annular piston 8 does not occur.

When the brake pedal is released, the brake pressure is reduced in the opposite direction via the open valve-closing member 11 ant via the check valve 133, in the direction of the brake pressure transducer 5.

If the pressure difference between the valve inlet (main cylinder/pump pressure) and the outlet of the valve (wheel brake pressure) exceeds a value set by the compression spring 7 during a brake slip control with the inlet valve closed, the annular piston 8 is displaced against the spring force as a consequence of the resulting force of pressure at the sealing ring 124. This displacement causes the annular piston 8 to come into sealing contact with the solenoid core 127. Thus, there is a pressurized medium communication with the wheel brake 3 only via the diaphragm 4 of the annular piston 8.

If the inlet valve 1 again opens its regular passage via the valve-closing member 11, the fluid supplied flows from the auxiliary pressure pump 18, which operates during brake slip control, exclusively via the diaphragm 4 in the annular piston 8 to the wheel brake 3. In this way, the pressure shock and consequently the noise are reduced during the subsequent repeated closing of the inlet valve 1. When the switching pressure difference drops below the value necessary for actuating the annular piston 8, such as by an interruption in the braking process, the annular piston 8 returns into the starting position which increases the flow passage to the wheel brake 3.

In summary, the influence of the rate of pressure build-up during manual brake operation is negligibly small due to the present invention, because the pressure gradient established at the annular piston or the pressure difference in the constricted flow cross section, and consequently also in the constricted channel branch, inevitably increases with an increasing rate of pressure build-up, as a result of which the switchable diaphragm remains ineffective during the normal braking phase and consequently with the valve-closing member opened. The switchover pressure, at which the annular piston during brake slip control is activated, can thus also be reduced considerably, as a result of which the variations in the volume flow can also be advantageously kept at a low value for the purpose of good control performance during brake slip control. The valve noises inevitably also decrease compared with the solutions suggested to date, and the pressure build-up gradient can be increased, if desired or necessary, for the manually controlled, locking-free brake operation.

List of Reference Numbers

1 Inlet valve
2 Main pressure line
3 Wheel brake
4 Diaphragm
5 Brake pressure transducer
7 Compression spring
8 Annular piston
9 Valve-mounting body
10 Valve support
11 Valve-closing member
18 Auxiliary pressure pump
21 Plate filter
22 Ring filter
114 Central body
115 Sealing seat
116 Valve seat
117 Space
119 Outer shoulder
124 Sealing ring
126 Annular space
127 Solenoid core
129 Channel branch
130 Channel constriction
131 Diaphragm insert
132 Pressurized medium path
133 Check valve
134 Recess
135 Shoulder
136 Fixed diaphragm

We claim:

1. A solenoid valve for hydraulic brake systems with slip control, said valve comprising:

a valve support defining an annular space having first and second hydraulically isolated regions;

a central body held within said valve support and having:
  (a) a first opening at a first end which forms a valve seat through which pressurized medium flows from said central body when said valve seat is open, and
  (b) a second opening at a second end, opposite from said first end, through which pressurized medium flows into said central body and having a diameter smaller than said first opening of said central body;

a valve-closing member for selectively preventing pressurized medium flow through said valve seat;

an annular piston:
  (a) having:
    (1) a first opening into said first region of said annular space at a first end of said annular piston and through which pressurized medium flows into said first region of said annular space when said valve seat is open,
    (2) a second opening into said first region of said annular space and through which pressurized medium flows into said first region of said annular space when said valve seat is open, and
    (3) a second end, opposite from said first end of said annular piston, exposed to pressurized medium flow in said second region of said annular space,
  (b) mounted on and movable, relative to said central body, in response to pressurized fluid flow in said second region of said annular space between:
    (1) a first position at which pressurized medium flows into said first region of said annular space in parallel through said first and said second openings of said annular piston, and
    (2) a second position at which said annular piston is in contact with said valve support to close said first opening of said annular piston and prevent pressurized medium flow through said first opening of said annular piston into said first region of said annular space, while pressurized medium flows through said second opening of said annular piston into said first region of annular space;

a pressurized medium output line for delivering pressurized medium flow from said first region of said annular space to brakes of the brake system; and a pressurized medium input line for introducing pressurized medium flow:
  (a) through said second and said first openings in said central body and said first and said second openings in said annular piston to said first region of said annular space, and
  (b) into said second region of said annular space to urge movement of said annular piston to said second position of said annular piston when the pressure of said pressurized medium flow introduced through said pressurized medium input line exceeds the pressure of said pressurized medium flow delivered by said pressurized medium output line by a prescribed amount.

2. A solenoid valve in accordance with claim 1, wherein said second region of said annular space is a channel branch defined by said central body, said valve support and said a second end said annular piston.

3. A solenoid valve in accordance with claim 2, further including a sealing ring disposed on said second end of said annular piston.

4. A solenoid valve in accordance with claim 3, wherein said channel branch opens between said pressurized medium input line and said second opening to said central body.

5. A solenoid valve in accordance with claim 4, further including a valve mounting body through which said pressurized medium input line and said pressurized medium output line extend and in which said valve support is mounted.

6. A solenoid valve in accordance with claim 5, further including an insert at said second opening to said central body.

7. A solenoid valve in accordance with claim 6, wherein said insert is a thin-walled nozzle fastened to said valve support.

8. A solenoid valve in accordance with claim 7, further including a plate filter fastened to said valve support and said insert has a shoulder which is clamped between said plate filter and said valve support.

9. A solenoid valve in accordance with claim 8, wherein a pressurized medium bypass path extends through said valve support between said pressurized medium input line and said pressurized medium output line.

10. A solenoid valve in accordance with claim 9, further including a check valve disposed in said pressurized medium bypass path and opening in the direction of said pressurized medium input line.

* * * * *